United States Patent
Bird et al.

(10) Patent No.: US 11,052,360 B2
(45) Date of Patent: Jul. 6, 2021

(54) MIXING MACHINE SYSTEM

(71) Applicant: ILLINOIS TOOL WORKS INC., Glenview, IL (US)

(72) Inventors: Matthew W. Bird, Fairborn, OH (US); Ruben T. Huerta-Ochoa, Troy, OH (US); Lawrence S. Leung, Troy, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 437 days.

(21) Appl. No.: 16/114,605

(22) Filed: Aug. 28, 2018

(65) Prior Publication Data

US 2018/0361335 A1 Dec. 20, 2018

Related U.S. Application Data

(63) Continuation-in-part of application No. 15/906,344, filed on Feb. 27, 2018, now Pat. No. 10,743,550.

(Continued)

(51) Int. Cl.
*B01F 15/00* (2006.01)
*A47J 43/08* (2006.01)
(Continued)

(52) U.S. Cl.
CPC ..... *B01F 15/00253* (2013.01); *A47J 43/0711* (2013.01); *A47J 43/0727* (2013.01); *A47J 43/082* (2013.01); *B01F 7/1605* (2013.01); *B01F 7/30* (2013.01); *B01F 15/00259* (2013.01); *A47J 2043/04463* (2013.01); *B01F 2215/0011* (2013.01); *F16H 1/28* (2013.01); *F16N 2210/12* (2013.01); *F16N 2250/08* (2013.01); *F16N 2250/18* (2013.01); *F16N 2260/04* (2013.01); *F16N 2260/06* (2013.01)

(58) Field of Classification Search
CPC .......................... B01F 15/00201; A47J 43/082
USPC ................................. 366/206, 287, 288, 601
See application file for complete search history.

(56) References Cited

U.S. PATENT DOCUMENTS

| 1,767,002 A | 6/1930 | Meeker et al. |
| 1,781,321 A | 11/1930 | DeHuff |

(Continued)

FOREIGN PATENT DOCUMENTS

| EP | 2448220 | 5/2012 |
| WO | WO 2005/112722 | 12/2005 |
| WO | WO 2016/145430 | 9/2016 |

*Primary Examiner* — David L Sorkin
(74) *Attorney, Agent, or Firm* — Thompson Hine LLP

(57) ABSTRACT

A mixing machine includes a head extending over a bowl receiving location, the head including a downwardly extending rotatable output shaft for receiving a mixer tool. A drive train including a motor having an output operatively connected to drive a planetary gear system that effects rotation of the rotatable output shaft about its axis and orbiting of the shaft axis about another axis. A control system includes a master control unit and a slave control unit, the master control unit connected with a first sensor located along the drive train between the motor and the planetary gear system, the slave control unit connected with a second sensor, wherein both the slave control unit and the second sensor rotate with a part of the planetary gear system, wherein the master control unit and the slave control unit are configured for wireless communication with each other.

10 Claims, 11 Drawing Sheets

Related U.S. Application Data

(60) Provisional application No. 62/464,435, filed on Feb. 28, 2017.

(51) Int. Cl.

| | |
|---|---|
| *A47J 43/07* | (2006.01) |
| *B01F 7/16* | (2006.01) |
| *B01F 7/30* | (2006.01) |
| *F16H 1/28* | (2006.01) |
| *A47J 43/044* | (2006.01) |

(56) References Cited

U.S. PATENT DOCUMENTS

| | | | |
|---|---|---|---|
| 2,019,911 A | 11/1935 | Meeker | |
| 2,181,079 A | 11/1939 | DeHuff | |
| 2,185,155 A | 12/1939 | Meeker et al. | |
| 2,251,903 A | 8/1941 | Anstice et al. | |
| 2,616,673 A | 11/1952 | Van Guilder | |
| 3,422,330 A | 1/1969 | Swanke | |
| 3,951,351 A | 4/1976 | Ernster et al. | |
| 4,568,193 A | 2/1986 | Contri et al. | |
| 4,697,929 A | 10/1987 | Muller | |
| 4,819,460 A | 4/1989 | Obradovic | |
| 4,822,172 A | 4/1989 | Stottmann | |
| 4,860,816 A | 8/1989 | Bond | |
| 4,893,942 A | 1/1990 | Stottmann | |
| 5,000,578 A | 3/1991 | Artin et al. | |
| 5,087,864 A | 2/1992 | Abel | |
| 5,140,248 A | 8/1992 | Rowan et al. | |
| 5,204,606 A | 4/1993 | Kuwahara et al. | |
| 5,306,083 A | 4/1994 | Caldwell et al. | |
| 5,348,393 A | 9/1994 | Pappas, Jr. | |
| 5,472,276 A | 12/1995 | Ratermann et al. | |
| 5,547,278 A | 8/1996 | Xie | |
| 5,570,955 A | 11/1996 | Swartwout et al. | |
| 5,653,535 A | 8/1997 | Xie et al. | |
| 5,690,427 A | 11/1997 | Jennings | |
| 5,736,828 A | 4/1998 | Turner et al. | |
| 5,844,343 A | 12/1998 | Horst | |
| 5,872,435 A | 2/1999 | Bolte et al. | |
| 5,906,432 A | 5/1999 | Wade et al. | |
| 5,934,802 A | 8/1999 | Xie | |
| 5,955,861 A | 9/1999 | Jeong et al. | |
| 5,957,021 A | 9/1999 | Meredith et al. | |
| 6,066,074 A | 5/2000 | Marcinkiewicz | |
| 6,313,597 B1 | 11/2001 | Elliott et al. | |
| 6,429,612 B1 | 8/2002 | Kume et al. | |
| 6,638,122 B1 | 10/2003 | Griffith, Sr. | |
| 6,704,212 B2 | 3/2004 | Furukawa et al. | |
| D490,271 S | 5/2004 | Short et al. | |
| 6,750,629 B2 | 6/2004 | Shigemizu et al. | |
| 6,756,757 B2 | 6/2004 | Marcinkiewicz | |
| 6,883,959 B2 | 4/2005 | Donthnier et al. | |
| 6,953,278 B2 | 10/2005 | Short et al. | |
| 6,972,541 B2 | 12/2005 | Matsushiro et al. | |
| 6,998,557 B2 | 2/2006 | McGuffin-Noll | |
| 7,005,825 B2 | 2/2006 | Eguchi | |
| 7,014,354 B2 | 3/2006 | Donthnier et al. | |
| 7,207,711 B2 | 4/2007 | Huang | |
| 7,273,315 B2 | 9/2007 | Huang | |
| 7,384,187 B2 | 6/2008 | Blackburn | |
| 7,387,430 B2 | 6/2008 | Short | |
| 7,543,980 B2 | 6/2009 | Blackburn | |
| 7,950,843 B2 | 5/2011 | Blackburn | |
| 8,308,344 B2 | 11/2012 | Short | |
| 2002/0093877 A1 | 7/2002 | Brunswick et al. | |
| 2003/0165068 A1 | 9/2003 | Tomonaga | |
| 2004/0008005 A1 | 1/2004 | Sakai et al. | |
| 2004/0120213 A1 | 6/2004 | Short et al. | |
| 2004/0120215 A1 | 6/2004 | Huang et al. | |
| 2004/0208082 A1 | 10/2004 | Huang et al. | |
| 2005/0122836 A1 | 6/2005 | Boyle et al. | |
| 2005/0141340 A1 | 6/2005 | Donthnier et al. | |
| 2006/0044935 A1 | 3/2006 | Benelli | |
| 2006/0198240 A1 | 7/2006 | Short | |
| 2007/0195641 A1 | 8/2007 | Schnipke | |
| 2008/0221739 A1 | 9/2008 | Pryor | |
| 2008/0291777 A1 | 11/2008 | Schnipke | |
| 2012/0226764 A1 | 9/2012 | Philip | |
| 2013/0033957 A1* | 2/2013 | Huang | A47J 43/044 366/206 |
| 2013/0214716 A1* | 8/2013 | Barfus | B01F 7/00325 318/434 |
| 2014/0269154 A1 | 9/2014 | Kolar | |
| 2014/0345474 A1 | 11/2014 | Trench | |
| 2018/0059790 A1 | 3/2018 | Kolar | |

* cited by examiner

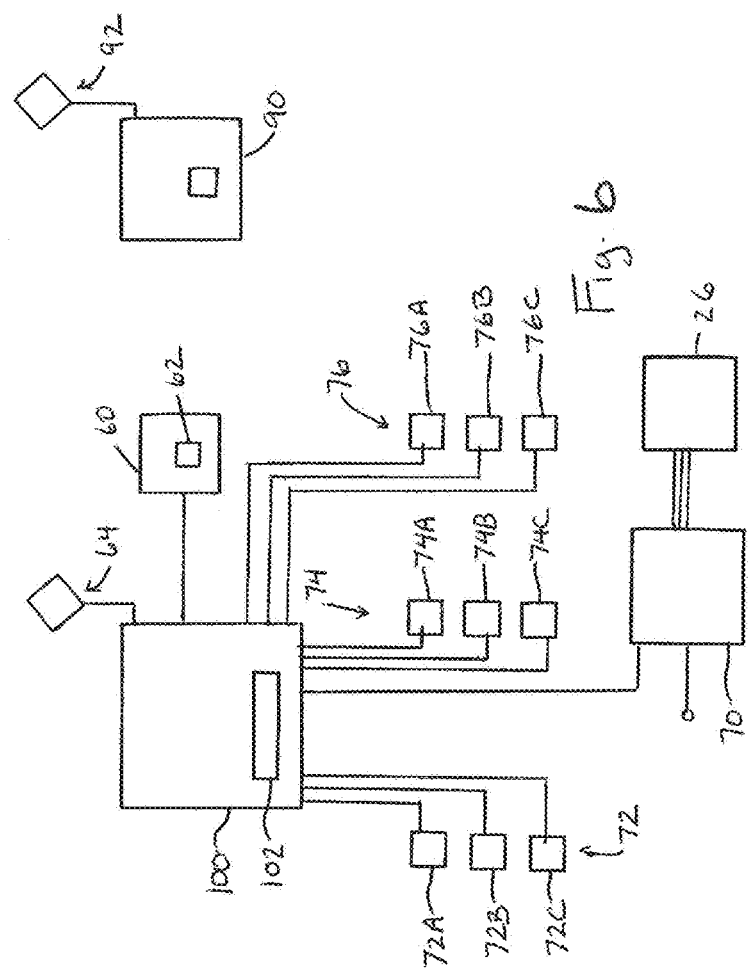

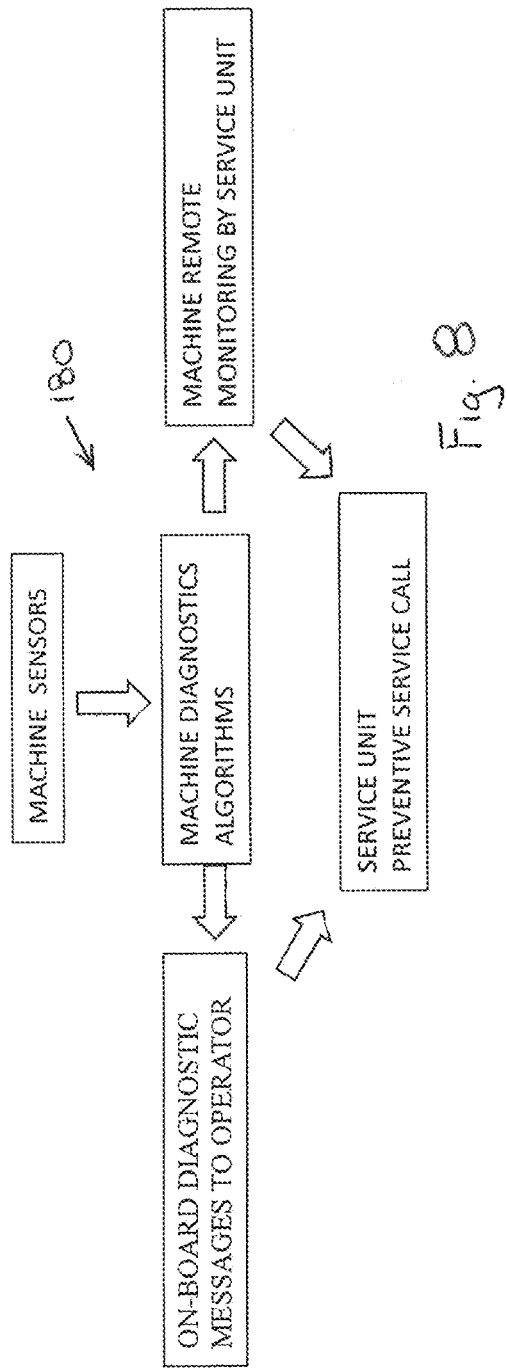

MIXING MACHINE SYSTEM

TECHNICAL FIELD

The present application relates generally to commercial mixers utilized for mixing food products such as dough, and more particularly to a commercial mixer and associated control and diagnostic system.

BACKGROUND

It is known in existing commercial mixers to provide multiple speed settings for the mixers. The various available mixing speeds are primarily driven by a motor through combinations of gears and/or belts and/or variable adjustable pulleys, where mechanical adjustments are made to change mix speeds. Many such devices require that the mixer be stopped in order to change speeds.

U.S. Pat. No. 7,207,711 is representative of a mixer that does not utilize mechanical adjustment of any drive linkage or gear system to change speeds, but instead simply adjusted the output speed of, for example, an AC induction motor. Even with the advantages provided by such a mixing machine drive and control arrangement, due to the relatively harsh operating conditions for such machines, service/repair issues regularly arise. In today's environment, such service/repair issues are handled on a reactive basis, which in some cases can result in undesirable down time for the mixing machine.

Existing mixers, generally include a transmission and motor. For example, an exemplary machine may include a motor, a transmission, and a variable frequency drive (VFD) to control the motor. Diagnostics for such a mixer include the following: looking through a sight-glass located on the rotating planetary while the mixer is not running to see the oil level in the planetary, use of a dip-stick to check the transmission case oil level (requiring removal of a mixer head cover to access the dip stick), and viewing any live error codes from the VFD on the display of the machine. In this regard, FIG. 1 shows an exemplary mixer 600 with a planetary sight-glass 602, and FIG. 2 shows an exemplary transmission dipstick 604 in the top of the transmission case 606. FIG. 3 shows an oil pump 608 within the planetary gear case 610. Problems encountered with this exemplary mixer configuration include that the machine must be off for transmission oil level to be checked, no transmission oil level can be obtained while mixer is running, and there is no history of transmission oil level available, making it difficult to differentiate between a leak and loss due to evaporation/decomposition, and no indicator is given to the operator or service personnel if the transmission oil level is too low. In addition, the machine must be off and the planetary must stop so that the sight-glass is not hidden in order to check the planetary oil level, no planetary oil level can be readily obtained while the mixer is running, no history of planetary oil level is available, and no indicator is provided as to whether the oil pump in the planetary is working properly, and thus sight-glass may indicate enough oil, but the planetary gears can still go without lubricant if the oil pump is malfunctioning. Further, the existing VFD display only shows current/live error messages, with no history of error messages displayable, and operators will not necessarily know what an error message means, which in some cases results in a failure to notify service in situations where service is needed.

Other issues with such existing machine from a general diagnostic perspective include: there is currently no way to predict when components are nearing or have passed their nominal life-cycle, there is currently no way to tell if there is excessive vibration which may indicate a worn-out ball bearing, there is currently no way to notify service automatically if there is a problem, and there is currently no way to automatically shut off the mixer if a critical problem is imminent. Minor issues which could be resolved with minimal time, effort, and expense can go undetected, resulting in more serious issues that can lead to down time and expensive repairs. Many component failures could be prevented if the problem was detected, identified and appropriate steps taken sooner.

With existing machines, service technicians typically make two trips: one to diagnose issues, and another to fix the problem. Service of food machines, such as mixers, is almost completely reactive as opposed to predictive which increases warranty cost and machine down time.

It would be desirable to provide a mixing machine that enables proactive service/repair and/or more effective service/repair to reduce any mixing machine down time.

SUMMARY

In one aspect, a mixing machine includes a control system with a drive for operating the motor, a plurality of sensors for detecting respective conditions of mixing machine, and a diagnostic control operable to track outputs from the sensors over time, analyze the outputs and produce an alert upon detection of a characteristic indicative of a need for service or repair.

In another aspect, a mixing machine includes a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis. A motor includes an output operatively connected to drive the gear system. A control system includes a drive for operating the motor, a plurality of sensors, each sensor located for detecting a respective condition of mixing machine, and a diagnostic control operable to (i) track outputs from the plurality of sensors over time, (ii) analyze such tracked outputs and (iii) produce an alert indication based upon the diagnostic control identifying a performance characteristic indicative of a need for service or repair of the mixing machine.

In a further aspect, a mixing machine includes a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis. A motor includes an output operatively connected to drive the planetary system. A control system includes a plurality of sensors, each sensor located for detecting a respective condition of mixing machine, and a diagnostic control operable to (i) track outputs from the plurality of sensors over time, (ii) analyze the tracked outputs and (iii) produce an alert indication based upon the diagnostic control identifying a performance characteristic indicative of a need for service or repair of the mixing machine.

In another aspect, a mixing machine includes a head extending over a bowl receiving location, the head including a downwardly extending rotatable output shaft for receiving a mixer tool. A drive train including a motor having an output operatively connected to drive a planetary gear system that effects rotation of the rotatable output shaft about its axis and orbiting of the shaft axis about another axis. A control system includes a master control unit and a slave control unit, the master control unit connected with a first sensor located along the drive train between the motor and the planetary gear system, the slave control unit connected with a second sensor, wherein both the slave control unit and the second sensor rotate with a part of the planetary gear system, wherein the master control unit and the slave control unit are configured for wireless communication with each other.

In a further aspect, a food processing machine includes a drive train including a motor having an output operatively connected to drive a gear system. A control system of the machine includes a primary control unit and a secondary control unit. The primary control unit is connected with a first sensor located along the drive train. The secondary control unit is connected with a second sensor, wherein both the secondary control unit and the second sensor rotate with a part of the drive train, wherein the secondary control unit is lacks any wired connection to the primary control unit and is configured for wireless communication with the primary control unit.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 6 shows an exemplary control system for the mixing machine;

FIG. 8 shows an exemplary maintenance/service system diagram of information flows;

DESCRIPTION

Figure 1:
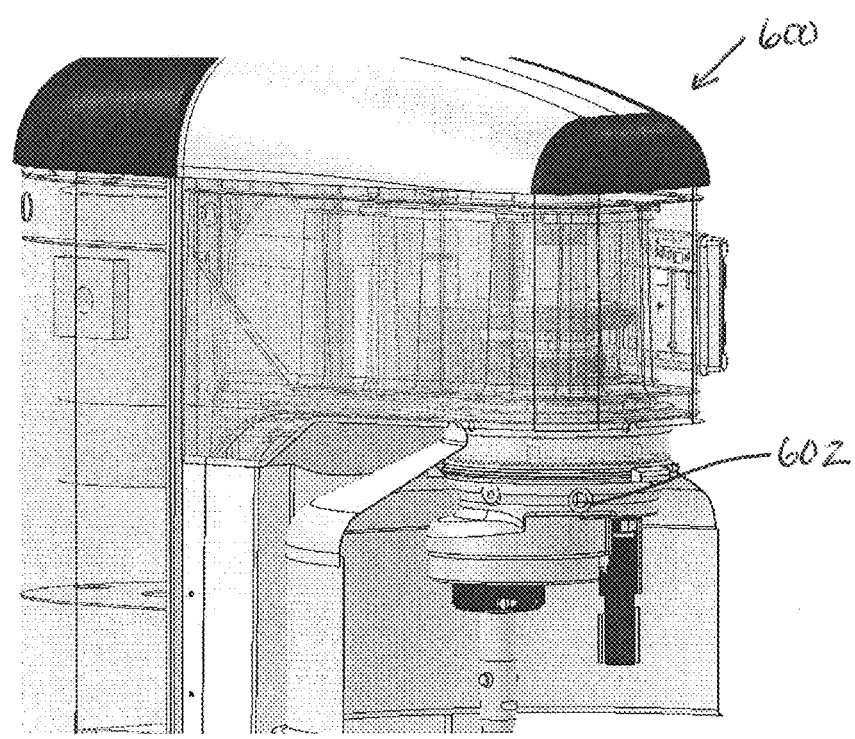
FIGS. 1-3 show partial views of an exemplary prior art mixer.
Figure 2:
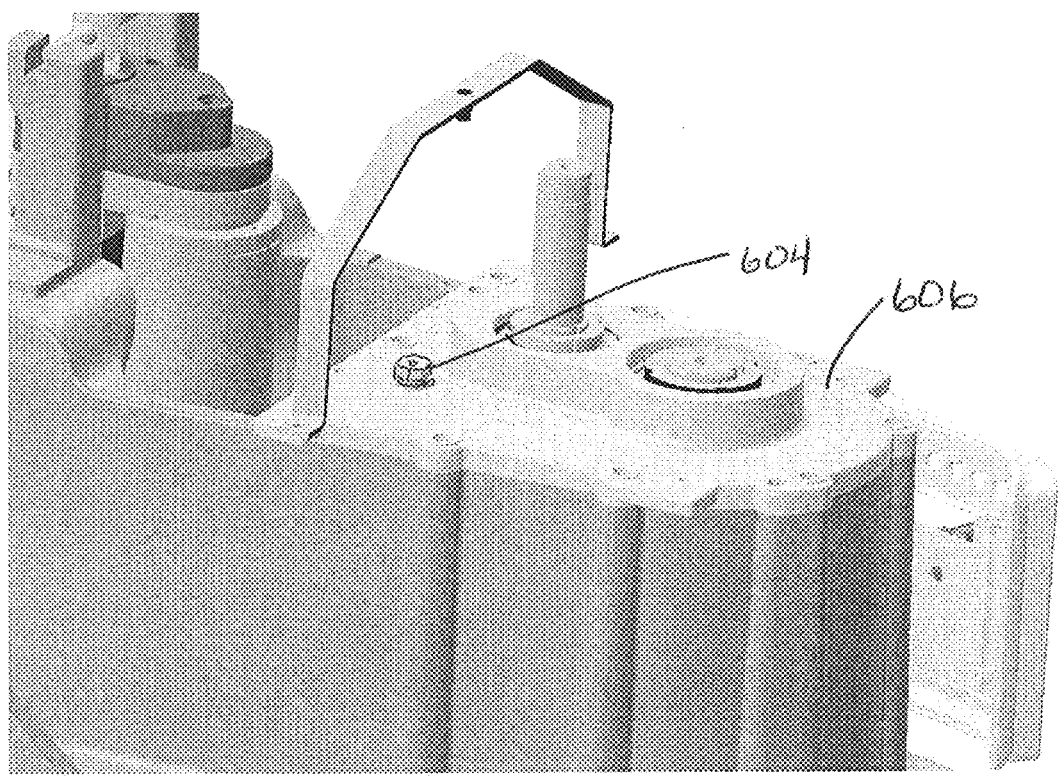
Figure 3:
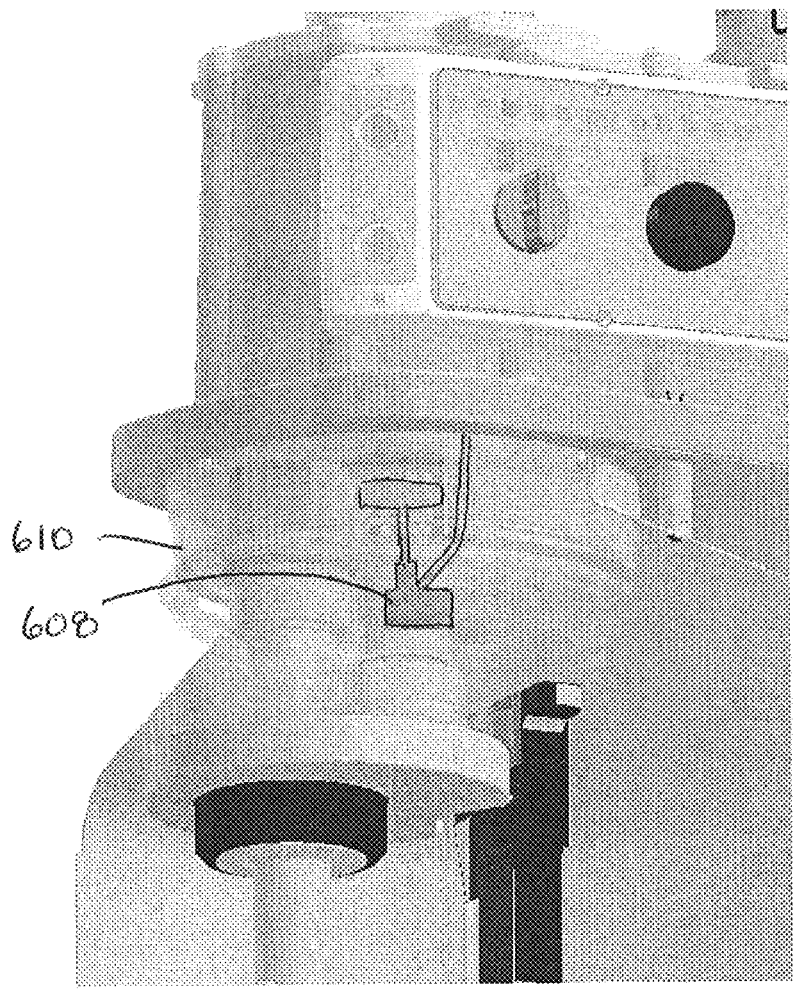
Figure 4:
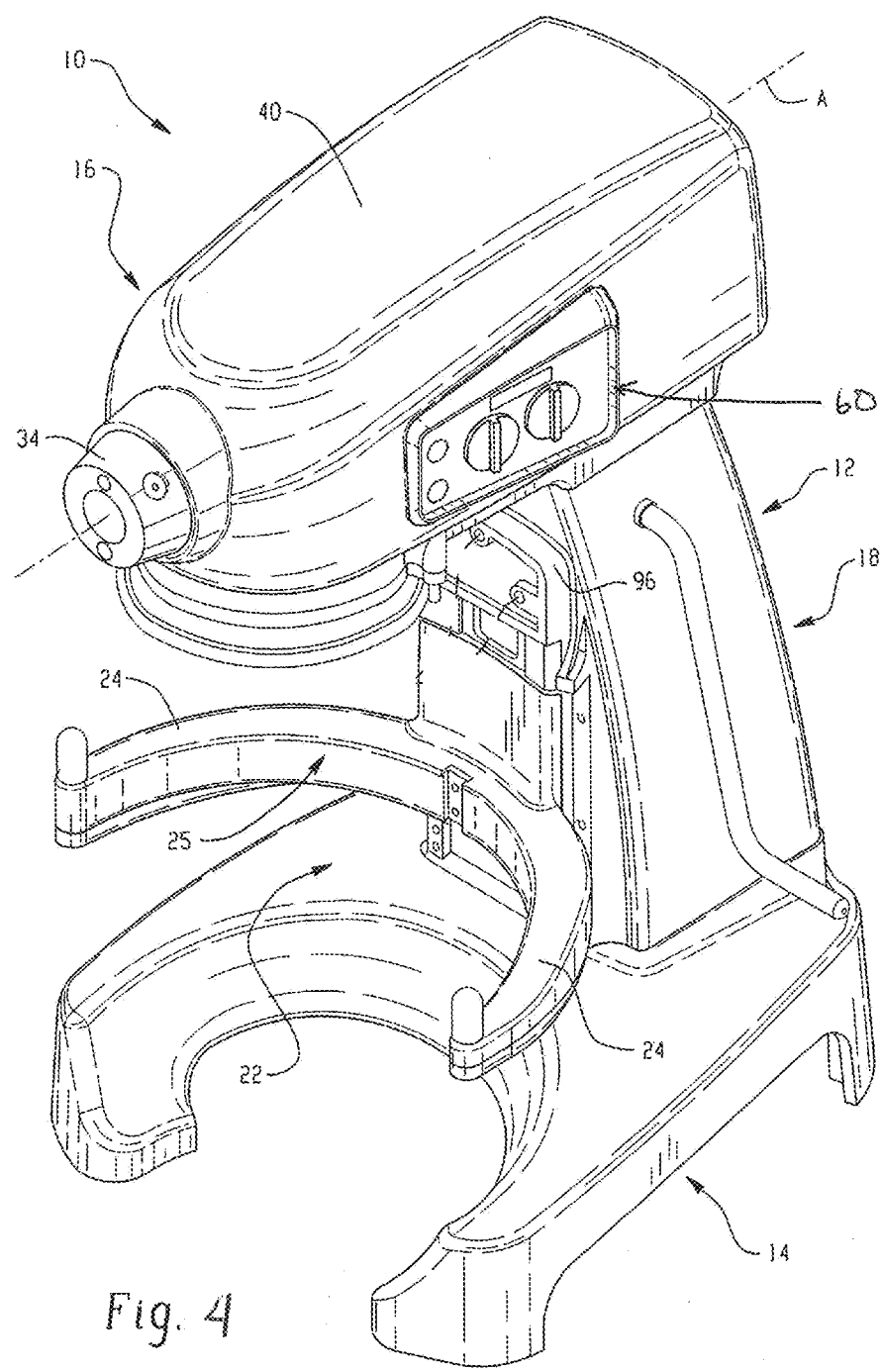
FIG. 4 shows a perspective view of a mixing machine.
Figure 5:
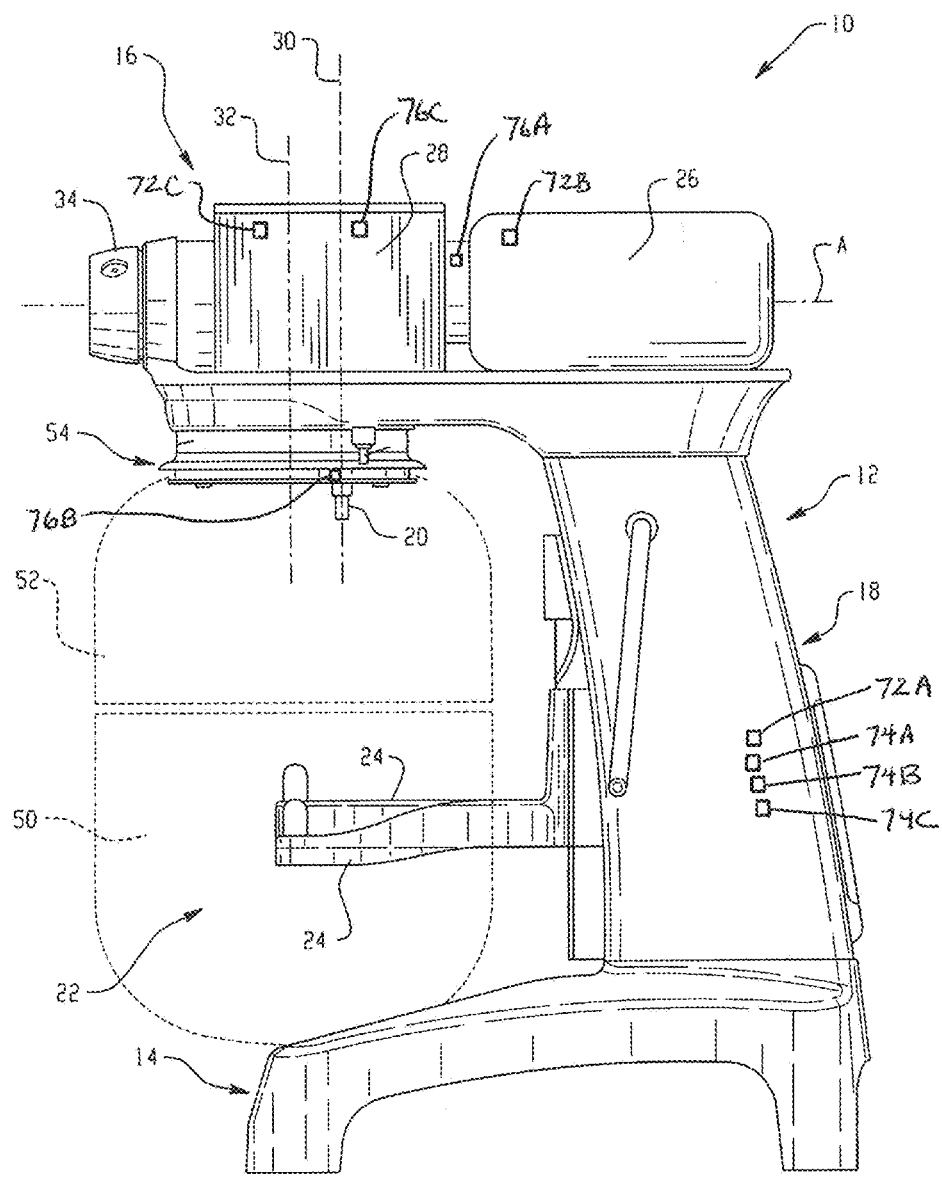
FIG. 5 shows a side view of the mixing machine of FIG. 1 with head cover removed.

Referring to FIGS. 4-5, a mixing machine 10 includes a mixer body 12 having a base portion 14, a head portion 16 and a support portion 18 (e.g., in the form of a column) connecting the head portion and the base portion in a vertically spaced apart relationship. A front to back head portion axis A is shown. An output member 20 (e.g., a shaft for receiving a mixer tool such as a beater or whip) extends downward from the head portion 16 in a direction toward a bowl receiving location 22 formed between the arms 24 of a bowl receiving yoke that can be moved upward and downward relative to the head portion 16 by rotation of the illustrated handle. Powered movement of the yoke is also possible. A motor 26 may be mechanically linked to the output member 20, as by a gear system 28, for effecting rotation of the output member about a first axis 30 and orbiting movement of the output member 20 and first axis 30 about a second axis 32 (e.g., a planetary movement or planetary rotation). A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28. Head cover 40 is shown installed in FIG. 4, but is removed in FIG. 5.

An exemplary mix position of a bowl 50 is shown schematically in FIG. 5, along with an exemplary position of a bowl guard assembly 52. Bowl guard support 54 is located at the underside of the head portion 16 of the mixer and supports at least part of the bowl guard assembly 52 in a manner that enables the part to be moved between a bowl guarding position and a bowl access position.

The mixing machine also includes a user interface 60 with manual user controls (e.g., physically movable buttons, knobs and/or switches) and/or electronic user input controls (e.g., a touch-screen interface), with an associated processor-based controller (e.g., control board(s)) 100. The user interface 60 may have one or more display fields or screens 62 (FIG. 6). One or more communication paths 64 can be associated with the controller, such as a wired communication path (e.g., USB, RS485, etc.) or a wireless communication path 64 (e.g., any of Bluetooth, ZigBee, NFC, LAN/WiFi, MAN/WiMAX, LoRaWAN or WAN/Cellular). The communication path(s) enable communication between the mixing machine control system and external/remote devices or systems 90 with respective communications 92.

The mixing machine control system may include a drive 70 for operating the motor 26 (e.g., a simple drive in the case of a single speed motor or a more dynamic drive, such as a variable frequency drive (VFD), in the case of a variable speed motor).

The mixing machine includes a plurality of sensors for detecting various operating conditions of mixing machine. For example, a set of temperatures sensors 72 (e.g., a controller/VFD heat sink temperature sensor 72A, a motor stator temperature sensor 72B and/or a transmission case temperature sensor 72C), power consumption sensors 74 (e.g., a voltage sensor 74A, a current sensor 74B and/or additional current sensor 74C) and/or mechanical sensors 76 (e.g., a motor shaft position encoder 76A, an output shaft position encoder 76B and/or a transmission case accelerometer 76C) can be provided at various locations in the mixing machine to detect respective conditions of the mixing machine as shown.

A diagnostic control 102 is provided as part of the controller 100 configuration and is operable to track outputs from the various sensors over time. In one implementation, the diagnostic control 102 identifies maximum or minimum condition indicated by each sensor during each mixing operation carried out and stores such maximum or minimum condition in memory for analysis. The diagnostic control 102 is also operable to analyze the stored outputs and produce an alert or alerts upon detection of a characteristic indicative of a need for service or repair of the mixing machine. Exemplary diagnostic alert messages may include motor overheating, transmission overheating, open circuit, short circuit, machine overloading, locked rotor, transmission damage or failure and/or bearing and shaft damage or failure. The alerts may be delivered to one or more of (i) the on-board user interface 60, (ii) a remote device or system 90 (e.g., a mixing machine operator phone, Tablet or computer at the facility where the mixing machine is located, or a service technician phone, Tablet or computer remote from the facility where the mixing machine is located). The alerts may be in the form of a warning message if the characteristic is a trend of one of the conditions toward a defined limit (e.g., preset in memory) over time, or may be a fault message if the characteristic is the one of the conditions actually reaching the defined limit.

In this regard, Table 1 below shows exemplary sensors employed in one implementation of a mixing machine, and Table 2 below shows exemplary diagnostic messages identified and generated by the diagnostic control as alert indications.

TABLE 1

Exemplary Sensor(s)
Mixing Machine Sensors

Controller/VFD Heat Sink Temperature 72A
Motor Stator Temperature 72B
Transmission Case Temperature 72C
Input Voltage 74A
Input Electric Current 74B
Output Electrical Current 74C
Motor Shaft Position Encoder 76A
Output Shaft Position Encoder 76B
Transmission Case Accelerometer 76C

TABLE 2

Exemplary Diagnostic Alert Indications

| Diagnostic | Warning Alert | Fault Alert |
| --- | --- | --- |
| Motor Overheating | If motor temperature (per 72B) trends towards a temperature limit | If motor temperature (per 72B) exceeds a temperature limit |
| Transmission Overheating | If transmission temperature (per 72C) trends towards a temperature limit | If transmission temperature (per 72C) exceeds a temperature limit |
| Open Circuit | If input current (per 74B) goes to zero | If input current (per 74B) remains at zero |
| Short Circuit - line side | N/A | If input current (per 74B) and input current rate of change exceed a defined limit |
| Short Circuit - load side | N/A | If output current (per 74C) exceeds a defined limit due to ground fault in the output circuit or missing phase reported to lose wire |
| Machine Overloading | If power consumption ($I^2t$ logic) trends toward a limit | If power consumption ($I^2t$ logic) exceeds a limit |
| Locked Rotor | N/A | Motor shaft speed (per 76A) and output shaft speed (per 76B) remain at or near zero after motor startup |
| Transmission Failure | N/A | If output shaft speed (per 76B) remains at or near zero after motor start up (but motor shaft speed does not) |
| Bearing and Shaft | If vibration (per 76C) trends toward a vibration limit | If vibration (per 76C) exceeds a vibration limit |

Figure 7A:
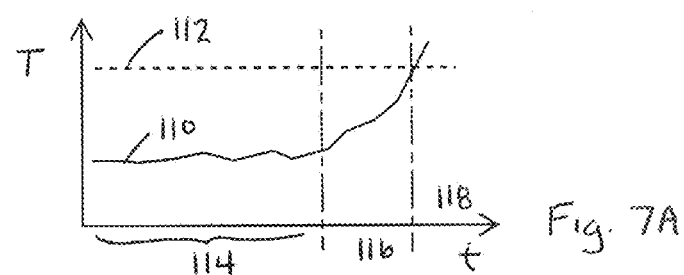
FIGS. 7A-7G show exemplary diagnostic graphs implemented by the control system.
Figure 7B:
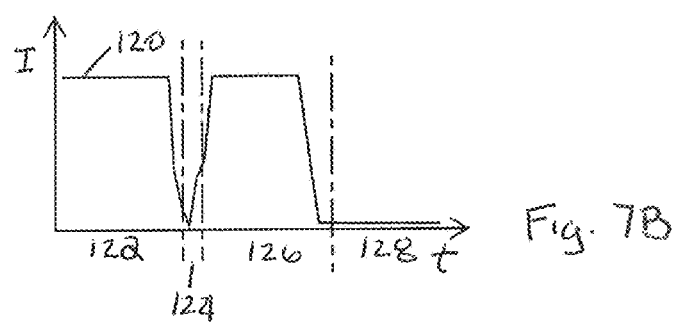
Figure 7C:
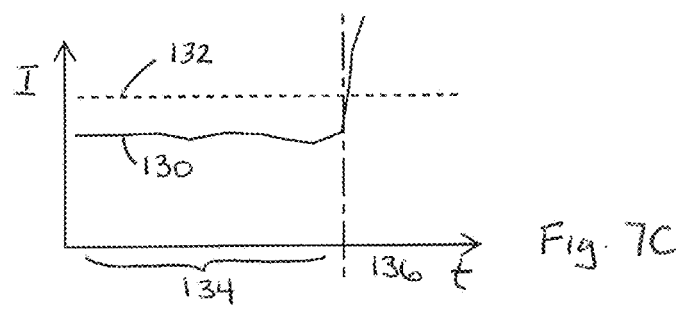
Figure 7D:
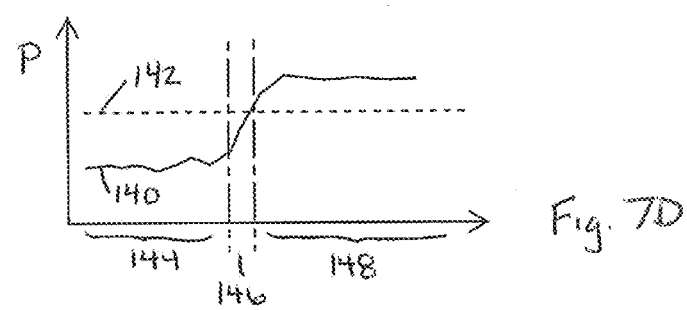
Figure 7E:
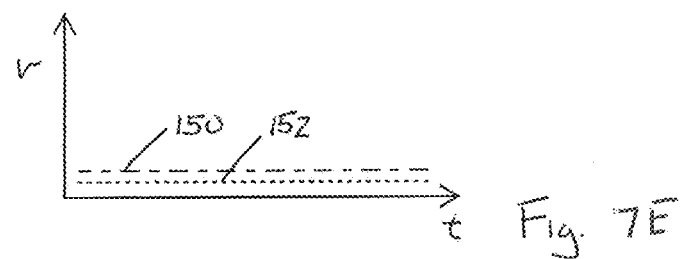
Figure 7F:
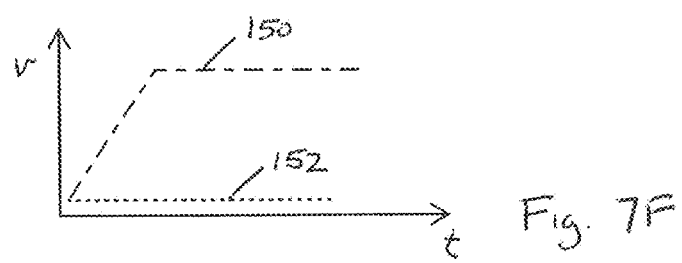
Figure 7G:
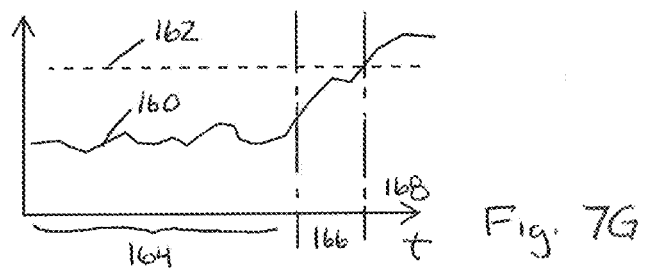

In relation to the above noted messages, reference is made to FIGS. 7A-7G showing representative graphs of sensor conditions over time for specific diagnostics. FIG. 7A shows an exemplary temperature diagnostic (either motor or transmission or VFD) in which the temperature condition 110 indicated by the sensor relative to a set temperature limit 112 is shown, where the diagnostic control would operate with no alert in zone 114, a warning alert in zone 116 and a fault alert zone 118. FIG. 7B shows an exemplary open circuit diagnostic with input current 120 going to zero in zone 124 and remaining at zero in zone 128, where the diagnostic control would operate with no alert in zones 122 and 126, a warning alert in zone 124 and a fault alert in zone 128. FIG. 7C shows an exemplary short circuit diagnostic in which input current 130 is shown relative to a set current limit 132, in which the diagnostic control operates to produce no alert in zone 134 and a fault alert in zone 136. FIG. 7D shows an exemplary machine overload diagnostic in which power consumption 140 is shown relative to a set limit 142, in which the diagnostic control would operate with no alert in zone 144, a warning alert in zone 146 and a fault alert in zone 148. FIG. 7E shows an exemplary locked rotor diagnostic in which both motor shaft speed 150 and output shaft speed 152 are shown as being zero (or near zero), where the diagnostic control would produce a fault alert. FIG. 7F shows an exemplary transmission failure diagnostic in which both motor shaft speed 150 and output shaft speed 152 are shown, where the diagnostic control would produce a fault alert. FIG. 7G shows an exemplary bearing and shaft diagnostic in which vibration level 160 is shown relative to a set vibration limit 162, where the diagnostic control would operate with no alert in zone 164, a warning alert in zone 166 and a fault alert in zone 168.

In some cases, the mixing machine control system includes multiple stored mix programs. For example, each mix program could include at least one mix speed and mix time, or in other cases multiple mix speeds with respective mix times, each of which will be carried out in sequence when the mix program is initiated and run on the machine. Each mix program may be selectable via the user interface of the machine. In such cases, the diagnostic control will track outputs from the sensors over time according to the mix program that results in the outputs, so that analysis of the outputs for detection of the characteristic indicative of a need for service or repair is conducted on a mix program by mix program basis. In this manner, potential condition discrepancies caused by differences between mixing operations can be avoided. By way of example, where a temperature condition is being monitored, the diagnostic control may include one temperature limit for a first mix program and another temperature limit for a second mix program, etc. Where an input current condition is being monitored, the diagnostic control may include one input current limit for a first mix program and another input current limit for a second mix program, etc. Where a power consumption condition is being monitored, the diagnostic control may include one power consumption limit for a first mix program and another power consumption limit for a second mix program, etc. Where a vibration condition is being monitored, the diagnostic control may include one vibration limit for a first mix program and another vibration limit for a second mix program, etc.

The on-board diagnostic control may be initially loaded with starting values for the monitored conditions by running each mixing program one or more times as a diagnostic set-up. The maximum or minimum limits for the conditions for each mixing program can then be set accordingly (e.g., selecting a limit that is a specified amount higher than the initial condition value determined during the diagnostic set-up). The on-board diagnostic control may run the diagnostics analysis of the data continuously or occasionally (e.g., at the end of each mixing operation, at the end of each day or each time the mixing machine is powered up).

The on-board diagnostic control may include more advanced features to not only produce an alert indication, but also to recommend specific service/repair actions. In other cases, the remote service technician device or system may include algorithms and further diagnostics to provide the service technician with such recommended service/repair actions. Predictive service/repair may be achieved that, in the long run, reduces mixing machine down time, as suggested by the system diagram 180 in FIG. 8. Moreover, the on-board diagnostic may be configured to disable a certain function or functions of the mixing machine (e.g., prevent mixing above a certain speed), or to shut down the machine, when a particular performance characteristic is identified.

Figure 9:
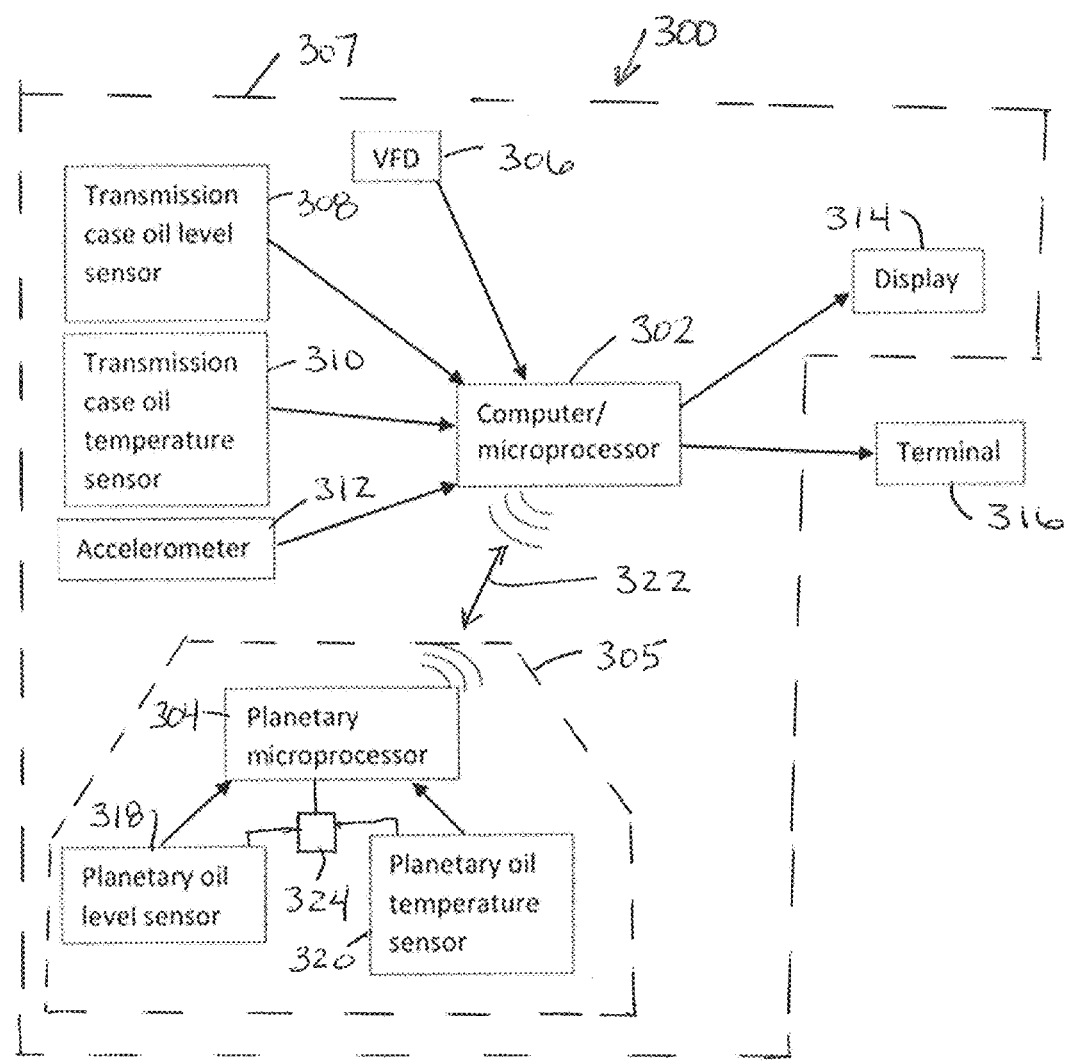
FIG. 9 shows another exemplary mixing machine control system incorporating wireless communication between on-board components.

Referring now to FIG. 9, another embodiment of a mixing machine control system 300 is shown and includes a primary or master control unit 302 and a secondary or slave control unit 304, where the slave control unit 304 is incorporated in or on part of the rotating planetary 305 of the mixing machine 307 (i.e., the master control unit 304 rotates when the planetary rotates). The master control unit 302 (e.g., microprocessor based) is connected to receive data from the VFD 306 and various sensors, such as a transmission oil level sensor 308, a transmission oil case temperature sensor 310, and an accelerometer(s) 312 associated with the transmission or other portion of the drive train. The master control unit 302 is also connected to the user interface/display 314 and may be connected to a remote system/computer/device 316 (via wired or wireless connection). The slave control unit 304 (e.g., microprocessor based) is connected to receive data from various sensors, such as a planetary oil level sensor 318 and a planetary oil temperature sensor 320, both of which also rotate with the planetary 305. In this system 300 the various sensors 308, 310, 312 may act as slaves to the master control unit 302. The planetary control unit 304 is also slave to the master control unit 302, with sensors 318 and 320 slave to the planetary control unit 304. The master control unit may be configured to prompt each sensor, as well as the slave control unit 304, for a short stream of data on a periodic basis (e.g., every few minutes) or an aperiodic basis (e.g., triggered by certain functions or activities of the mixer) while the mixer is on.

Mixers have a unique situation in that there is an oil reservoir and oil pump housed within the rotating planetary body. Because the planetary is rotating during operation, there is no way to get a wire to components inside of a planetary. For the planetary sensors 318, 320 to relay information, a wireless connection 322 is utilized. By way of example, Bluetooth or wifi technology can be utilized to transfer data between the two control units 302 and 304. In addition, sensors 318, 320 are designed as low power sensors that can be placed in stand-by mode so as to reduce power consumption. Limiting power consumption is important for the sensors 318, 320 in the planetary as they are powered by a remote battery 324 that will lose its charge over time and need to be replaced.

For the diagnostic data to be useful, thresholds and algorithms 326 are established and incorporated into the master control unit 302 alone or both the master control unit 302 and the planetary control unit 304. The sensor data collected and stored over time in an on-board historical database is evaluated to identify potential issues. Various diagnostics can then be carried out on-board the mixing machine, as explained below.

Predictive diagnostic algorithms may be provided for evaluation of the oil level sensor data. For example, if the oil level sensor 318 readings reflect that the planetary oil level is increasing over time, a likely cause is that the oil in the transmission case is leaking down into the planetary. In such cases, the control system can issue an alert/message to the machine interface 314 and/or remote system 316 indicating the nature of the problem (e.g., leaking transmission case), as well as steps to be taken to address the problem (e.g., service call required). If the oil level (either transmission or planetary) gradually decreases over a long period of time (e.g., the rate of decrease is below a specific threshold), the oil is most likely evaporating/breaking down, suggesting it should be refilled. In such cases, the control system can issue an alert/message to the machine interface 314 and/or remote system 316 indicating the nature of the problem (e.g., oil breaking down), as well as steps to be taken to address the problem (e.g., fill oil). If the oil level (transmission or planetary) decreases rapidly (e.g., the rate of decrease is above a set threshold), an oil seal is likely bad causing a leak, and a catastrophic failure may be imminent. In such cases, the control system can issue an alert/message to the machine interface 314 and/or remote system 316 indicating the nature of the problem (e.g., severe oil leak), as well as steps to be taken to address the problem (e.g., service call required), and/or take proactive action to prevent the failure (i.e., lockout further mixer operation or at least limit permitted drive speed). If the planetary oil level does not drop once the mixer is turned on and operating (e.g., drop in such condition is null or less than a low threshold), that is a sign that the planetary oil pump is not working to pull the oil out of the reservoir and a catastrophic failure may be imminent. In such cases, the control system can issue an alert/message to the machine interface 314 and/or remote system 316 indicating the nature of the problem (e.g., faulty oil pump), as well as steps to be taken to address the problem (e.g., service call required) and/or take proactive action to prevent the failure (i.e., lockout further mixer operation or at least limit permitted drive speed).

Predictive diagnostic algorithms may also be provided for evaluation of oil temperature sensor data. If the temperature sensor readings reflect a rapid rise in the temperature (e.g., rate of rise/increase above a high threshold) of the oil (transmission or planetary), this can indicate excessive wear on components or an oil pump malfunction. In such cases, the control system can issue an alert/message to the machine interface 314 and/or remote system 316 indicating the nature of the problem (e.g., faulty oil pump), as well as steps to be taken to address the problem (e.g., service call required), and/or take proactive action to prevent the failure (i.e., lockout further mixer operation or at least limit permitted drive speed). Some components will fail at certain temperatures, and therefore temperature thresholds can be set in the diagnostics to predict such potential failures. Again, in such cases the control system can issue an alert/message to the machine interface 314 and/or remote system 316 indicating the nature of the problem (e.g., excessive temperature condition), as well steps to be taken to address the problem (e.g., service call required), and/or take proactive action to prevent the failure (i.e., lockout further mixer operation or at least limit permitted drive speed).

Figure 10:
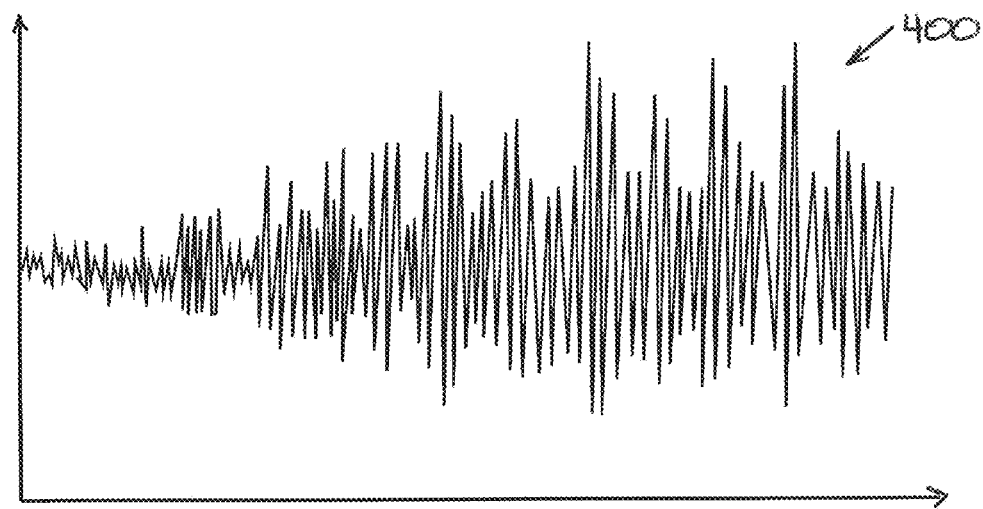
FIG. 10 shows an exemplary graph of accelerometer data in the time domain.
Figure 11:
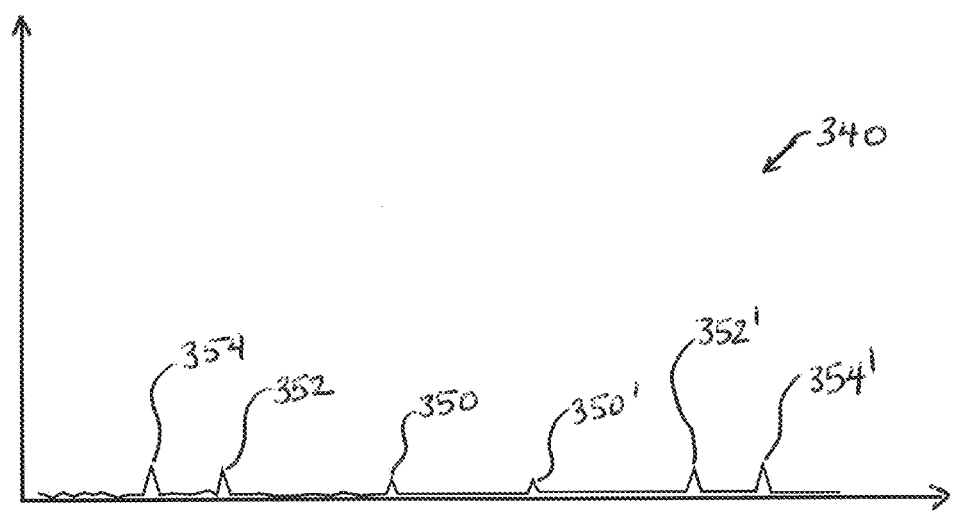
FIG. 11 shows an exemplary graph of accelerometer data in the frequency domain.

Predictive diagnostic algorithms may also be provided for evaluation of accelerometer data. A relatively simple accelerometer can output both acceleration and time data. Basic accelerometers paired with the control unit 302 can take sampling rates fast enough (e.g., one data set in less than every 5 milliseconds) to pick up meaningful vibration characteristics. The control unit 302 can take this data and utilize FFT (Fast Fourier Transform) algorithms to change the acceleration vs time data 400 (see FIG. 10) into the frequency domain 340. For a typical machine, there will be a few 'active' frequencies 350, 352, 354 (see FIG. 11), which are typically mirrored at frequencies. These frequencies are related to the vibrations caused by different speeds of operation. In the mixer for example, each frequency will relate to a specific shaft speed, which when correctly identified, relates to a specific one of the shafts in the drive train. As the control unit 302 monitors the frequency domain, changes in energy at specific frequencies may be observed. If there is a large change in energy at a specific frequency, then there is in general, more vibration at a specific shaft corresponding to that frequency. If more vibration at a specific shaft is detected and identified by the logic, it is likely that a bearing associated with that specific shaft is failing. In such cases, the control system can issue an alert/message to the machine interface 314 and/or remote system 316 indicating the nature of the problem (e.g., bearing 1 requires replacement), as well as steps to be taken to address the problem (e.g., service call required), and/or take proactive action to prevent a failure (i.e., lockout further mixer operation or at least limit permitted drive speed).

Generally, the master control unit 302 will prompt each of the sensors at different respective times for data and analyze it (e.g., only one sensor at a time). Data can then be sent to a display (a screen on the mixer user interface or somewhere else that is easily accessible for the customer) and/or sent to the internet to a remote computer/terminal where the data can be stored and observed by a technician later. Information about each component's cycle life can also be stored on-board. Estimating the amount of cycles that each component has had can give a good indication of when that component will fail statistically.

As mentioned above, after the control system has analyzed the data using predictive diagnostic algorithms, actions can be taken. If a catastrophic failure is imminent, for instance, a warning to the customer can be displayed, the mixer can automatically shut down, and/or a notification can be sent to service personnel via email, virtual monitor, etc.

Advantages of the described system include reduced warranty cost by finding small problems before they lead to bigger and more expensive problems, reduced customer down time by replacing parts that are going bad before they fail, only one trip for the service technician for many applications is needed as diagnostics are already complete, and the system provides predictive, as opposed to reactive, servicing, which will lower customer cost and down time.

It is to be clearly understood that the above description is intended by way of illustration and example only, is not intended to be taken by way of limitation, and that other changes and modifications are possible.

What is claimed is:

1. A mixing machine, comprising:
 a head extending over a bowl receiving location, the head including a downwardly extending rotatable output shaft for receiving a mixer tool;
 a drive train including a motor having an output operatively connected to drive a planetary gear system, where the planetary gear system effects rotation of the rotatable output shaft about its axis and orbiting of the shaft axis about another axis;
 a user interface;
 a control system including:
  a master control unit connected with a first sensor located along the drive train between the motor and the planetary gear system, the master control unit also connected to the user interface;
  a slave control unit connected with a second sensor, wherein both the slave control unit and the second sensor rotate with a part of the planetary gear system, wherein the master control unit and the slave control unit are configured for wireless communication with each other.

2. The mixing machine of claim 1 wherein the slave control unit and the second sensor are connected to be powered by a battery, wherein the battery rotates with the part of the planetary gear system.

3. The mixing machine of claim 2 wherein the second sensor includes a standby mode.

4. The mixing machine of claim 1, further comprising a third sensor connected with the slave control unit, the third sensor rotates with the part of the planetary gear system.

5. The mixing machine of claim 4, wherein the second sensor is a planetary oil level sensor and the third sensor is a planetary oil temperature sensor.

6. The mixing machine of claim 5 wherein the master control unit is configured to request data from the second sensor and the third sensor through the slave control unit.

7. The mixing machine of claim 6 wherein the master control unit is configured to store data obtained from the second sensor and the third sensor in an on-board historical database.

8. The mixing machine of claim 7 wherein the master control unit is configured to analyze data from the second sensor to identify whether (i) the planetary oil level is increasing over time and/or (ii) the planetary oil level is gradually decreasing and/or (iii) the planetary oil level is rapidly decreasing or has rapidly decreased and/or (iv) the planetary oil level fails to drop once mixer operation begins, and in the event of such an identification to generate an alert message.

9. The mixing machine of claim 7 wherein the master control unit is configured to analyze data from the third sensor to identify (i) a rapid rise in planetary oil temperature in excess of a threshold rate and/or (ii) a planetary oil temperature in excess of a threshold temperature, and in the event of such an identification to generate an alert message.

10. The mixing machine of claim 1 wherein the second sensor is a planetary oil level sensor, and the master control unit is configured to (i) obtain data from the second sensor through the slave control unit, (ii) store data obtained from the second sensor in an on-board historical database, and (iii) identify a condition in which the planetary oil level fails to drop once mixer operation begins, and in the event of such condition identification to generate an alert message indicating that a planetary oil pump has failed or is failing.

* * * * *